(12) United States Patent
Kelly et al.

(10) Patent No.: US 6,674,935 B2
(45) Date of Patent: Jan. 6, 2004

(54) OPTICAL CONNECTION ARRANGEMENTS

(75) Inventors: Colin Geoffrey Kelly, Manotick (CA); Robert Michael Bierman, Nepean (CA)

(73) Assignee: Tropic Networks Inc., Ottawa (CA)

( * ) Notice: Subject to any disclaimer, the term of this patent is extended or adjusted under 35 U.S.C. 154(b) by 101 days.

(21) Appl. No.: 09/880,811

(22) Filed: Jun. 15, 2001

(65) Prior Publication Data

US 2002/0191899 A1 Dec. 19, 2002

(51) Int. Cl.[7] ................................................. G02B 6/28
(52) U.S. Cl. .......................................... 385/24; 385/16
(58) Field of Search ............................ 385/24, 15, 16, 385/39, 47, 134–139

(56) References Cited

U.S. PATENT DOCUMENTS

| | | | |
|---|---|---|---|
| 5,771,112 A | 6/1998 | Hamel et al. | 359/128 |
| 5,784,516 A | 7/1998 | Parzygnat et al. | 385/134 |
| 5,793,909 A | 8/1998 | Leone et al. | 385/24 |
| 5,825,517 A | 10/1998 | Antoniades et al. | |
| 5,986,783 A | 11/1999 | Sharma et al. | |
| 6,038,045 A | 3/2000 | Sotom et al. | 359/128 |
| 6,069,719 A * | 5/2000 | Mizrahi | 359/124 |
| 6,088,497 A | 7/2000 | Phillips et al. | 385/48 |
| 2002/0146226 A1 * | 10/2002 | Davis et al. | 385/126 |

* cited by examiner

*Primary Examiner*—Khiem Nguyen
(74) *Attorney, Agent, or Firm*—Victoria Donnelly (57) ABSTRACT

An optical connection arrangement is provided in an optical path to facilitate changing optical add/drop multiplexer (OADM) and other optical component modules while optical traffic is present on the optical path, with minimal interruption to such traffic. The connection arrangement has a plurality of optical ports to each of which an optical component can be coupled, and one or more optical switches which can be controlled to selectively include in the optical path or bypass each optical port. Such connection arrangements can be coupled in series and/or in parallel for convenient modular add/drop configurations and for opposite directions of transmission of optical traffic on respective optical paths.

19 Claims, 4 Drawing Sheets

OPTICAL CONNECTION ARRANGEMENTS

This invention relates to optical connection arrangements, and is particularly concerned with an arrangement for facilitating modifications to optical connections during operation of an optical communications system which for example uses wavelength division multiplexing (WDM).

BACKGROUND

It is known to provide a WDM optical communication system, referred to below for brevity simply as an optical system, in which two or more optical channels are carried on a single optical fiber, each channel comprising an optical signal at a respective wavelength. At any node in the optical system, it may be desired to terminate one or more of the channels, for which purpose it is known to provide an optical add/drop multiplexer (optical ADM, or OADM). An OADM typically comprises one or more optical channel filters and/or one or more optical band filters, where an optical band comprises a plurality of optical channels to be dropped and added. Optical channel and band filters are well known in the art and need not be described here.

The use of OADMs to drop and add individual optical channels or bands provides the advantage that the node-to-node optical connectivity of the optical system can be different from the physical connectivity of the optical fibers used to carry the channels. For example, the optical fibers may extend between adjacent nodes of an optical system, whereas the optical connectivity can be such that nodes can be selectively bypassed by some channels, depending upon the optical filters provided at the nodes. Consequently, each node in such an optical system can have an OADM with a set of optical filters that are customized for that node.

As an example of this, an optical system may comprise a ring of four nodes A–D with optical fibers between adjacent nodes to provide bidirectional communication of optical signals between the adjacent nodes using three optical channels (i.e. wavelengths) 1–3. A full mesh optical connectivity can be provided among all of the nodes A–D if all of the nodes drop and add channel 1, nodes A and C also drop and add channel 2, and nodes B and D also drop and add channel 3.

Such a process of dropping and adding specific wavelengths or wavebands at respective nodes is referred to as wavelength or waveband routing.

Typically, an optical system using wavelength or waveband routing is initially deployed with different optical filters at the respective nodes, and for cost reasons only as much equipment is installed as is necessary to meet actual or short-term forecasted traffic requirements.

Over time, however, it may become necessary to modify such an optical system to meet changing requirements, for example to provide additional channels or to change the wavelength or waveband routing. Such modifications typically involve identification and disconnection of optical fibers at the nodes, addition or replacement of OADMs and/or other components such as optical transmitter and receiver cards, optical amplifiers, and dispersion compensation modules, and reconnection of the optical fibers, these steps being necessary individually for each node.

The disconnection and reconnection of optical fibers interrupts traffic for all nodes communicating via the respective fibers. In optical systems with protection switching, a protection switch can be forced to route traffic around an optical fiber to be disconnected. While this can reduce the adverse effects of modifications on traffic having the highest priority for protection, it nevertheless reduces the traffic capacity of the optical system, and results in the optical system having reduced or no protection resources against an actual fault that may occur during the modification process. This disadvantage is exacerbated by the fact that similar steps must be carried out at each node, necessitating multiple forced protection switches and an excessive time during which the optical system has reduced capacity and reduced protection resources.

In addition, the density of a typical optical system and the similar appearance of different optical fibers tend to make the manual task of sorting and identifying optical fibers to be disconnected and reconnected time consuming, expensive, and prone to errors. Furthermore, the fiber handling itself can lead to fiber damage, for example increased fiber losses due to micro-bending, and increases risks of obtaining dirty optical connections, so that operating margins of the optical system may be reduced, and consequent problems may arise at the time of the modifications or subsequently.

Consequently, there is a need to provide an improved optical connection arrangement, which can enable modifications such as those discussed above to be made in a manner to reduce or avoid these disadvantages.

SUMMARY OF THE INVENTION

According to one aspect of this invention there is provided an optical connection arrangement comprising: a plurality of optical ports each comprising at least two optical connections for respectively supplying an optical signal to and receiving an optical signal from an optical component coupled to the respective port; an optical signal input; an optical signal output; and at least one optical switch coupled to the optical signal input, the optical signal output, and the plurality of optical ports, the optical switch being controllable to provide an optical path from the optical signal input to the optical signal output selectively via none, one, or at least two of the plurality of optical ports.

In different embodiments of the invention, such connection arrangements can be combined in various series and/or parallel combinations, and the at least one optical switch can comprise 1×2 and 2×2 optical switches, or one or more N×N optical switches where N is an integer greater than 2.

In particular embodiments of the invention, each optical port has an optical connection to one of two optical outputs of a preceding optical switch stage, and an optical connection to one of two inputs of a following switch stage, the optical switch stages constituting said at least one optical switch, a first one of said optical switch stages having an optical input coupled to said optical signal input and a last one of said optical switch stages having an optical output coupled to said optical signal output, the arrangement further comprising an optical coupling from another of the two optical outputs of each said preceding optical switch stage to another of the two inputs of the respective following switch stage for optically bypassing the respective optical port, each optical switch stage having two optical connection states between its input(s) and its output(s), the optical switch stages being controllable to include selectively each optical port in, or selectively exclude it from, an optical path from said optical signal input to said optical signal output.

Another aspect of the invention provides an optical add/drop multiplexer (OADM) arrangement comprising: an optical connection arrangement in an optical path, the optical connection arrangement comprising at least one optical switch and a plurality of optical ports each of which can be selectively included in the optical path or bypassed by control of said at least one optical switch, the optical ports each being arranged for coupling of an OADM thereto so that different OADMs can be coupled each to any of said plurality of optical ports; and at least one OADM optically coupled to a respective optical port of the optical connection arrangement.

A further aspect of the invention provides a method of modifying optical couplings of one or more optical components to an optical path, comprising the steps of: providing in the optical path an optical connection arrangement having a plurality of optical ports each of which can be selectively included in the optical path or bypassed by control of at least one optical switch of the optical connection arrangement; changing optical couplings of at least one optical component to a respective optical port while the optical connection arrangement is controlled to selectively bypass the respective optical port; and subsequently controlling the optical connection arrangement to selectively include the respective optical port and said optical component in the optical path.

BRIEF DESCRIPTION OF THE DRAWINGS

The invention will be further understood from the following description by way of example with reference to the accompanying drawings, in which the same references are used in different figures to denote similar elements and in which.

DETAILED DESCRIPTION

Figure 1:
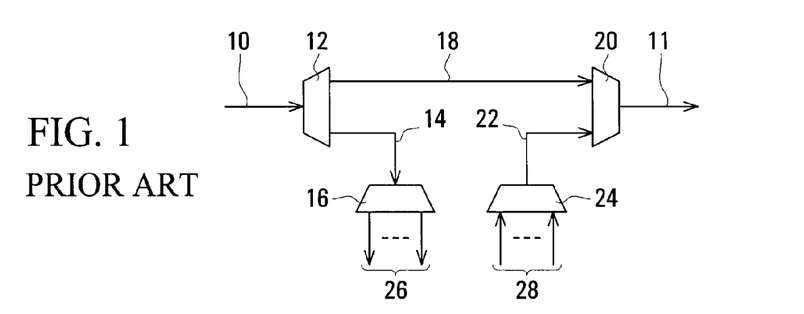
FIG. 1 shows a known optical add/drop multiplexer.

Referring to the drawings, FIG. 1 illustrates a known optical add/drop multiplexer (OADM) for dropping and adding an optical band comprising a plurality of optical channels transmitted in one direction (left to right as shown in FIG. 1) on an optical fiber 10. The OADM of FIG. 1 comprises an optical band filter 12 having an optical input to which the optical fiber 10 is connected, and having two optical outputs one of which is coupled via an optical fiber 14 to an input of an optical channel filter 16 and the other of which is coupled via an optical fiber 18 to one input of an optical band filter 20. A second input of the band filter 20 is coupled via an optical fiber 22 to an output of an optical channel filter 24, and an output of the band filter 20 is coupled to an ongoing part 11 of the optical fiber 10.

The band filter 12 supplies a band of optical channels to be dropped by the OADM to the fiber 14, and supplies other optical channels to the fiber 18. The channel filter 16 demultiplexes the channels of this band into separate optical channels on respective optical fibers 26. Conversely, the channel filter 24 multiplexes optical channels supplied to it via respective optical fibers 28 into a similar or different optical band on the fiber 22, and the band filter 20 multiplexes this band of added optical channels with the other optical channels on the fiber 16.

As is known in the art, where the same optical bands and channels are dropped and added, the optical band filters 12 and 20 can be identical to one another, and the optical channel filters 16 and 24 can be identical to one another. Each filter can comprise an optical filter of known form having a filter wavelength and bandwidth appropriate for the optical band or channel to be dropped or added. Also, as is known in the art, each such filter can be reversible for optical signals in the opposite direction, and the OADM of FIG. 1 can also operate for optical signals in the opposite direction to that shown. Thus for example for optical signals that are transmitted in both directions on a single fiber, a single optical filter can serve both for dropping an optical band or channel in one direction and adding a similar optical band or channel for the opposite direction. However, the particular transmission directions shown in FIG. 1 are provided for ease of understanding, and the description is worded accordingly. Similar comments apply in respect of the various embodiments of the invention described below.

It can also be appreciated that the OADM of FIG. 1 can be simplified by omitting the optical band filters 12 and 20 and instead providing the optical channel filters 16 and 24 directly in the optical fiber 10, with the disadvantage of increased attenuation of the other optical channels on the fiber 18 if more than one optical channel is dropped and added. Accordingly, the following description refers in part simply to optical filters, without distinguishing between band and channel filters, and it can be appreciated that in each case this includes either an optical band filter adding or dropping one or more optical bands, or an optical channel filter adding or dropping one or more optical channels.

Furthermore, although as illustrated in FIG. 1 the OADM serves both to drop and to add optical channels, it can be appreciated that the OADM can be simplified to drop optical channels without adding any channels, or to add optical channels without dropping any channels, and the term OADM and the description should be understood accordingly. The same applies to other figures of the drawings and to each of the embodiments of the invention described below.

As discussed above, the OADM of FIG. 1 is coupled in the path of optical signals on the fiber 10, so that changes, for example to drop and add a different or an additional band of optical channels, involve an interruption of the optical signal including all channels on the fiber 10, and consequent disadvantages such as those discussed above.

Figure 2:
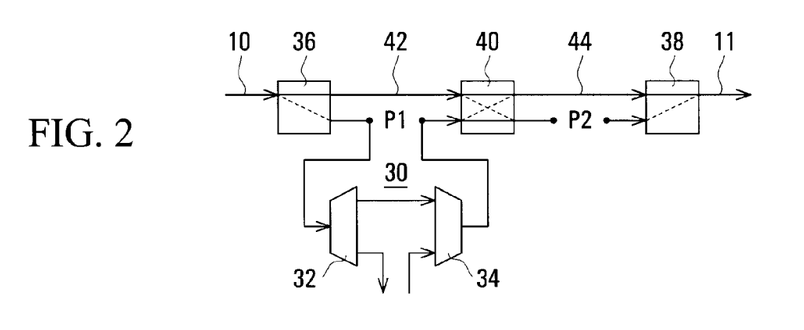
FIG. 2 illustrates an optical connection arrangement in accordance with an embodiment of the invention, also showing an OADM.

FIG. 2 illustrates an optical connection arrangement in accordance with an embodiment of the invention, also showing an OADM 30 which comprises optical filters 32 and 34. The connection arrangement of FIG. 2 comprises two 1×2 (1-pole 2-way) optical switches 36 and 38, a 2×2 (2-pole 2-way change-over) optical switch 40, and two optical ports P1 and P2. For each of the optical switches, a solid line indicates an optical path via the switch in one state and a broken line indicates an optical path via the switch in another state of the switch. The optical switches 36, 38, and 40 can be of any desired form, and their states can be controlled by optical system software via a control unit (not shown) in known manner.

In the connection arrangement of FIG. 2, the optical fiber 10 is coupled to the pole of the 1×2 switch 36, one optical output of which is coupled via an optical fiber 42 to one input of the 2×2 switch 40. One optical output of the 2×2 switch 40 is coupled via an optical fiber 44 to one optical input of the 1×2 switch 38, the pole of which is coupled to the ongoing part 11 of the optical fiber 10.

The optical port P1 is provided between the second optical output of the switch 36 and the second optical input of the switch 40, and the optical port P2 is provided between the second optical output of the switch 40 and the second optical input of the switch 38. Thus each of the optical ports P1 and P2 provides two optical fiber connections. For the illustrated optical signal direction, the fiber connection on the left of each port can supply an optical signal from the connection arrangement via the port, and the fiber connection on the right can provide an optical signal to the connection arrangement via the optical port; however, as indicated above the arrangement can equally be used for either or both transmission directions.

As illustrated in FIG. 2, the OADM 30 is coupled to the optical port P1, the fiber connection on the left of the port being coupled to the optical input of the optical filter 32 for dropping optical channels, and the fiber connection on the right of the port being coupled to the optical output of the optical filter 34 for adding optical channels.

It can be seen from FIG. 2 that the optical switches 36, 40, and 38 are provided in series in the main optical signal path from the fiber 10 to its ongoing part 11, and that the illustrated solid-line optical paths through these switches provide a continuous optical path for the optical signals on the fiber 10. Installation of the connection arrangement thus involves an interruption of this main optical signal path. Conveniently, such installation takes place during initial installation of the optical system, before there is any traffic on the fiber 10. Alternatively, the connection arrangement can be installed in an operating optical system, with traffic on the fiber 10 being interrupted only once for this installation. Thereafter, as described below modifications can be made with minimal traffic interruption and protection switching, under software control of the optical switches.

For example, with optical signal traffic on the fiber 10 conducted via the solid-line paths of the switches 36, 40, and 38 as shown in FIG. 2, the OADM 30 can be connected to and disconnected from the optical port P1 with minimal interruption of the traffic. For modifications to the optical system, for example the OADM 30 can be removed and replaced by another OADM for dropping and adding different optical channels. Further, another OADM (not shown) can be added at the optical port P2 in a similar manner. Alternatively, other forms of optical signal component, such as an optical amplifier, optical signal monitor, dispersion compensation module, or another connection arrangement as described herein, can be similarly added at each optical port.

Assuming that the OADM 30 is added at the optical port P1 as shown in FIG. 2 with traffic on the fiber 10 conducted via the solid-line positions of the switches 36, 40, and 38, the switches 36 and 40 can then be changed over under software control to their broken-line positions to connect the OADM 30 with minimal traffic disturbance and protection switching, for example within a fraction of a second, at a convenient time when traffic may be minimal. This permits rapid verification of the modified OADM arrangement, with almost instant reversal to the original state in the event of installation errors. With a modularized arrangement of the OADM 30 and the connection arrangement as further described below, this also substantially eliminates fiber handling and consequent errors and fiber damage.

Similarly, a second OADM or other optical component can be added at the optical port P2. After installation of such a component, the switch 40 can be returned to its solid-line state as shown, and the switch 38 can be simultaneously changed to its broken-line state as shown, under software control to connect this further component into the optical signal path, with the same advantages as discussed above.

For further expansion of the arrangement of FIG. 2 for example to accommodate more than two OADMs, a second or further connection arrangement as shown in FIG. 2 can be connected at any optical port, thereby providing two optical ports instead of one. For any such further connection arrangement, which is conveniently also provided in modular form, the optical input of the switch 36 and the optical output of the switch 38 are coupled to the respective fiber connections of the optical port. Alternatively, the connection arrangement and/or any further connection arrangement which is added can have additional optical switches and optical ports, as described further below.

Figure 3:
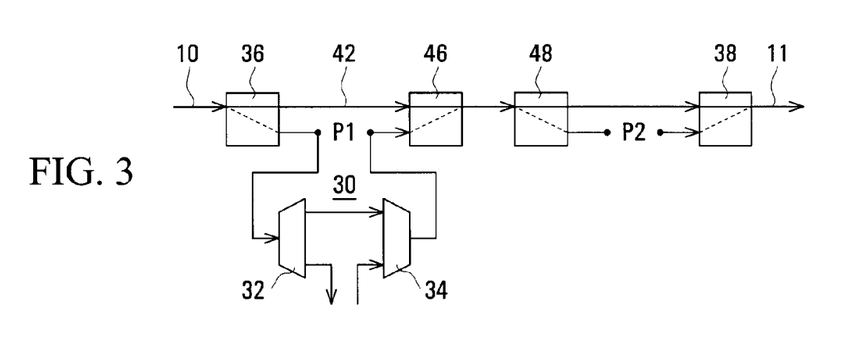
FIG. 3 illustrates a modification of the arrangement of FIG. 2.

FIG. 3 illustrates a modification of the arrangement of FIG. 2, in which the 2×2 optical switch 40 is replaced by two 1×2 optical switches 46 and 48, the poles of the two switches 46 and 48 being coupled together. Otherwise, the arrangement of FIG. 3 is the same as that of FIG. 2. In this case conveniently the optical switches 36 and 46 are commonly controlled and operated in synchronism with one another, and the optical switches 38 and 48 are also commonly controlled and operated in synchronism with one another.

In general, any 2×2 optical switch in the connection arrangement can be replaced by two 1×2 optical switches in the same manner, and conversely a 1×2 optical switch, such as the switch 36 or 38 in FIG. 2, can be replaced by a 2×2 optical switch part of which is unused. In the following description and corresponding figures of the drawings 2×2 optical switches are described and illustrated for simplicity and convenience, and it should be understood that any of these can be replaced by equivalent 1×2 optical switches.

Figure 4:
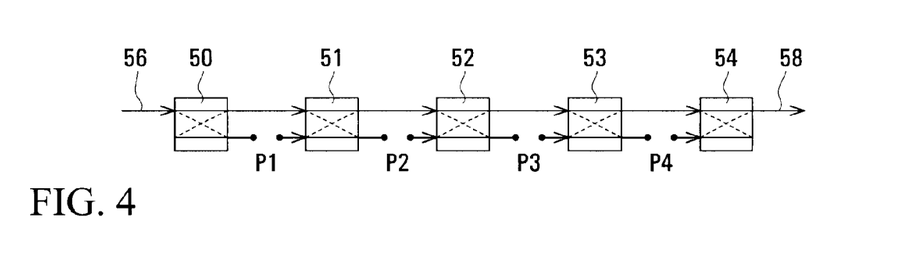
FIG. 4 illustrates a connection module in accordance with an embodiment of the invention, providing four optical connection ports.

The connection arrangements of FIGS. 2 and 3 each provide two optical ports P1 and P2, but they can be extended in a similar manner using additional optical switches to provide three or more optical ports. For example, it may be a convenient design choice for the connection arrangement to have a modular form with each connection module providing four optical ports; FIG. 4 illustrates such a connection module.

The connection module of FIG. 4 comprises five (one more than the number of optical ports) 2×2 optical switches 50 to 54 which are coupled between an input optical fiber 56 and an output optical fiber 58. The fibers 56 and 58 correspond respectively to the optical fiber 10 and its ongoing part 11 as described above, or can be connected to the left and right fiber connections of an optical port of another similar or different connection module. The switches 50 to 54 provide an optical path from the fiber 56 to the fiber 58 which can be switched, by changing the states of the switches as described above, to include none or any arbitrary one or more of the optical ports P1 to P4, which are provided respectively between the switches 50 and 51, 51 and 52, 52 and 53, and 53 and 54.

Optical systems typically provide bidirectional communications using two optical fibers, one for each direction of transmission, and OADMs typically provide add/drop pairs of optical filters. Connection modules in accordance with embodiments of the invention can accordingly be provided conveniently using two sets of series optical switches each for example as shown in FIG. 4, one set for each transmission direction.

Figure 5:
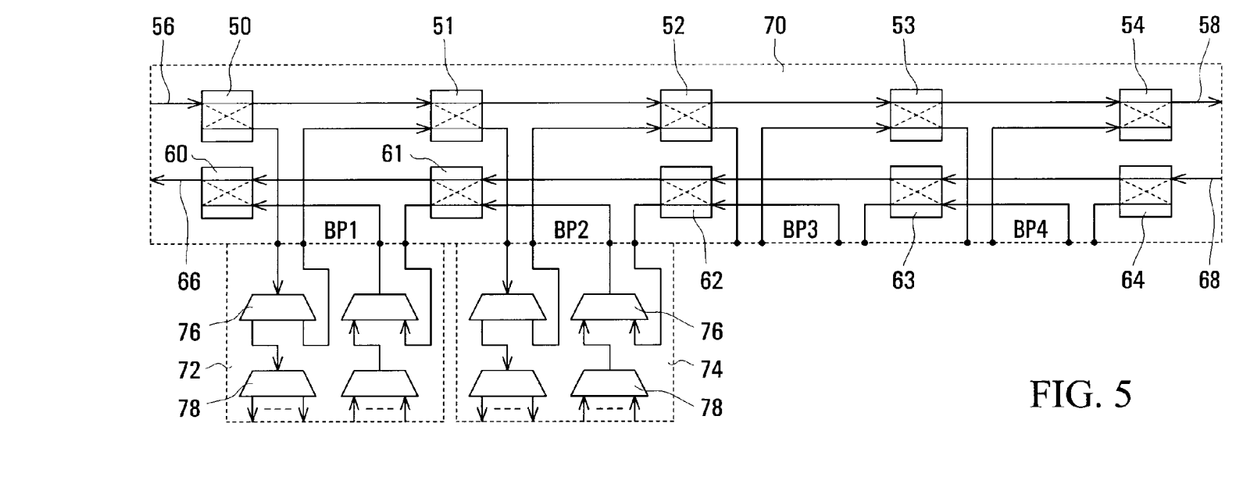
FIG. 5 illustrates two OADMs coupled to a connection module in accordance with another embodiment of the invention, providing four bidirectional optical connection ports.

FIG. 5 illustrates such a connection module 70, illustrated within a dashed-line box, comprising one set of optical switches 50 to 54 arranged in series between fibers 56 and 58, as described above, for a first direction of transmission and another set of switches 60 to 64, similarly arranged in series between fibers 66 and 68, for the opposite direction of transmission. The optical port between the switches 50 and 51 for the first direction of transmission, and a similarly provided optical port between the switches 60 and 61 for the opposite direction of transmission, together constitute a bidirectional optical port BP1 of the connection module. Correspondingly, the connection module 70 provides other bidirectional optical ports BP2 to BP4 between the other successive switches.

FIG. 5 also illustrates two OADM modules 72 and 74, coupled to the bidirectional optical ports BP1 and BP2 respectively. Each of the OADM modules 72 and 74 comprises optical band filters 76 and optical channel filters 78 for dropping optical channels from the first transmission direction and adding optical channels for the opposite transmission direction. Further OADM modules (not shown) can be connected to other bidirectional optical ports to add optical channels for the first transmission direction and to drop optical channels for the opposite transmission direction. It can be appreciated that, in order to minimize attenuation of optical channels, it is preferable to drop optical channels closer to the optical signal input, and to add optical channels closer to the optical signal output, of the connection module, and the arrangement of FIG. 5 can facilitate this.

In optical systems the two physical directions of fiber from an optical node, typically referred to as west and east directions, are often packaged separately for protection and upgrade reasons, and for wavelength routing purposes may carry different optical wavelengths, for example an optical node may drop one optical band from and add a different optical band to the optical signals on the fibers. It is convenient in this case to provide two concatenated connection modules in accordance with embodiments of this invention, one for each direction. Such an arrangement is illustrated in FIG. 6.

Figure 6:
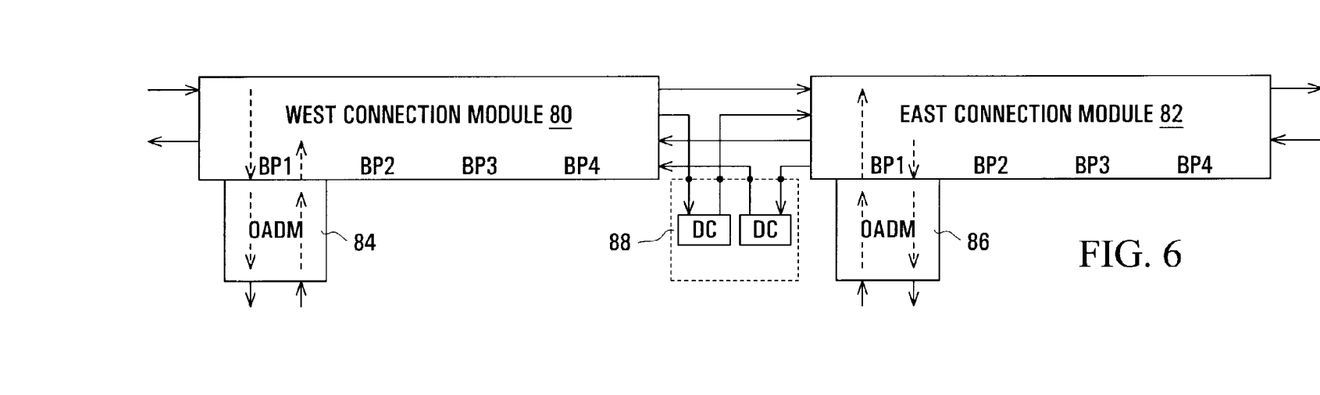
FIG. 6 illustrates an arrangement of connection modules in accordance with another embodiment of the invention.

As shown in FIG. 6, two connection modules, each of which can for example be a connection module 70 as described above with reference to FIG. 5 providing four bidirectional optical ports BP1 to BP4, are connected in series, or concatenated, with one another in the bidirectional optical fiber paths. The connection modules are referred to for convenience as a west connection module 80 and an east connection module 82. OADM modules, such as OADM modules 84 and 86 illustrated in FIG. 6, can be coupled to the optical ports BP1 to BP4 of each connection module as described above, the optical switches (not shown in FIG. 6) being controlled as described above to couple the OADMs into the fiber paths or bypass them as desired.

In the arrangement of FIG. 6, for simplicity drop and add paths for an optical band (or channel) are indicated by arrows. Thus the OADM 84 coupled to the optical port BP1 of the west connection module 80 drops an optical band from the optical signal being transmitted towards the right (east) in the drawing, and adds an optical band to the optical signal being transmitted towards the left (west). Conversely, the OADM 86 coupled to the optical port BP1 of the east connection module 82 drops an optical band from the optical signal being transmitted towards the left (west) in the drawing, and adds an optical band to the optical signal being transmitted towards the right (east).

The arrangement of FIG. 6 includes an additional bidirectional optical port which is provided between the concatenated modules 80 and 82, and more particularly between connections of adjacent 2×2 optical switches in the two modules which are otherwise unused as shown for example for the optical switches 54 and 56 in FIG. 5, in the same manner as the bidirectional optical ports between adjacent optical switches within the same connection module. FIG. 6 illustrates a dispersion compensation module 88, including a dispersion compensator (DC) for optical signals in each direction of transmission, coupled to this additional port. The dispersion compensators can be coupled into the optical paths, or omitted from these paths, under software control of the optical switches in a similar manner to that described above for the OADMs.

Instead of the dispersion compensation module 88, any other optical component which may be desired can be coupled to the additional bidirectional optical port (or to any of the ports). For expansion of the connection arrangement to more than the nine bidirectional optical ports provided by the arrangement of FIG. 6, such other optical component may comprise another connection module as illustrated in FIG. 7 or, to retain the separation of east and west components, another two such connection modules concatenated in the same manner as the connection modules 80 and 82 in FIG. 6.

Figure 7:
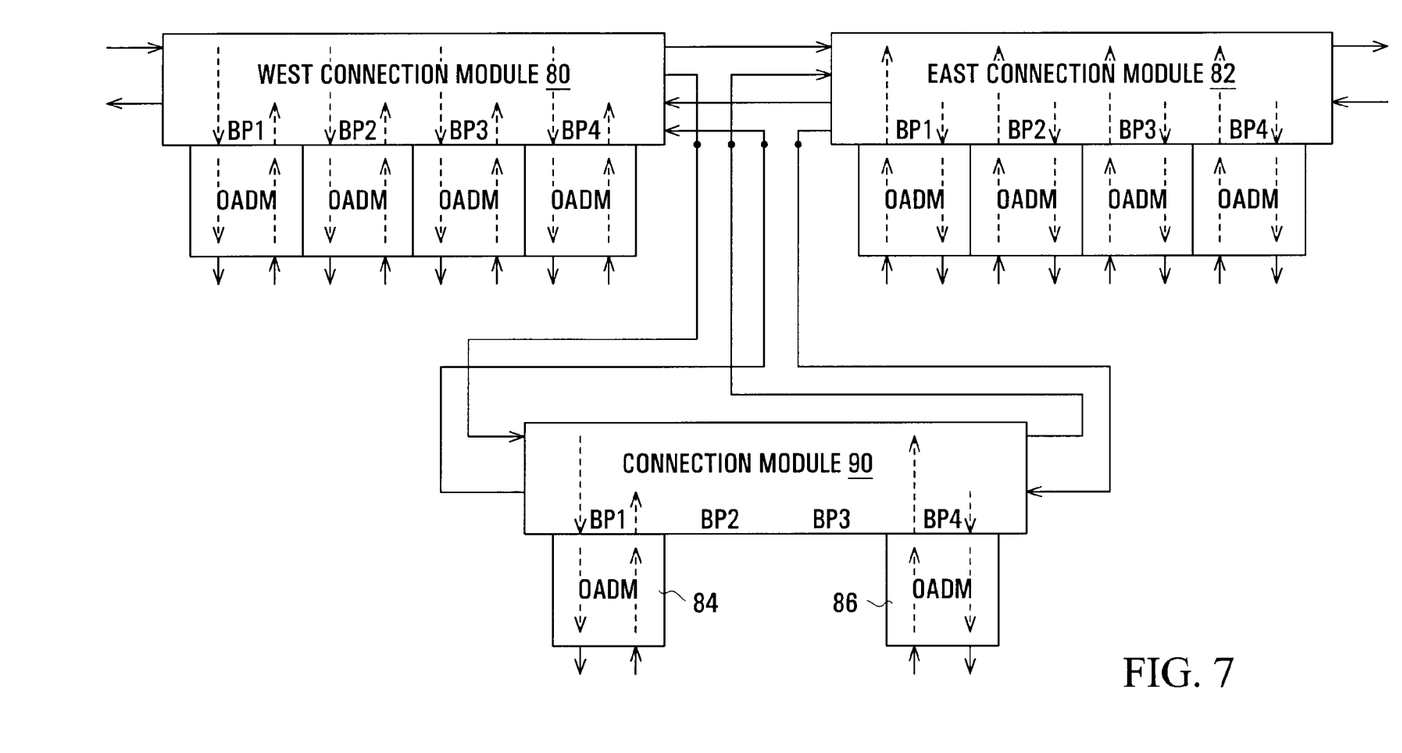
FIG. 7 illustrates an expanded arrangement of the connection modules.

Referring to FIG. 7, illustrating an expanded arrangement of the connection modules, an additional connection module 90, which can have the same form as the connection modules 70, 80, and 82 as described above, is coupled to the additional bidirectional optical port between the concatenated connection modules 80 and 82, so that it can be switched into the concatenated arrangement to provide additional bidirectional optical ports. FIG. 7 illustrates the connection modules 80 and 82 as being fully populated each with four OADMs, and further OADMs 84 and 86 coupled to the additional connection module 90. Further expansion of the connection arrangement can be similarly provided.

It can be appreciated that in all of the connection arrangements in accordance with embodiments of the invention as described above, the initial provision of one or more connection modules in the optical path enables arbitrary subsequent changes to be provided and incorporated into operation under software control via the optical switches, without the disadvantages discussed above in relation to the prior art.

Although the connection arrangements in accordance with embodiments of the invention as described above use series 2×2 (or an equivalent arrangement of 1×2) optical switches, the principles of the invention can alternatively be provided by a connection arrangement using one or more N×N optical switches where N is greater than 2.

Figure 8:
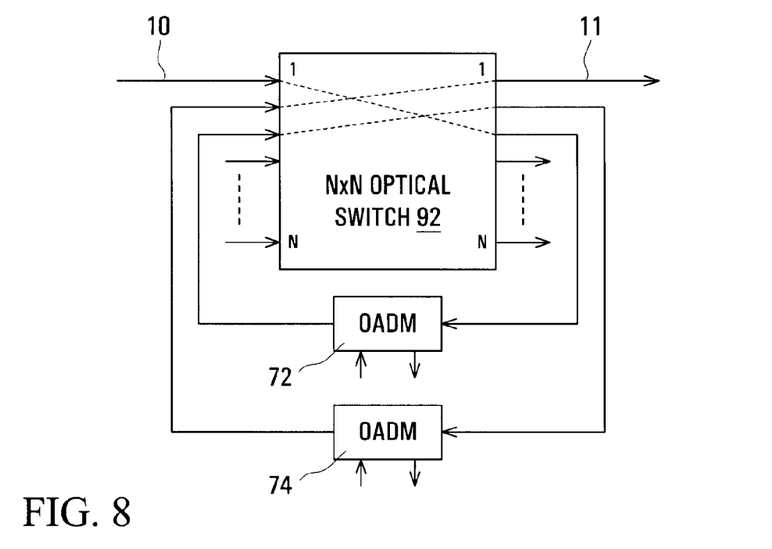
FIG. 8 illustrates an optical connection arrangement in accordance with another embodiment of the invention, using an N×N optical switch with N>2.

By way of example, FIG. 8 illustrates a connection arrangement in the form of an N×N optical switch 92, having N optical inputs and N optical outputs 1 to N numbered 1 to N, the optical switch being controllable to couple each optical input to any of the optical outputs. FIG. 8 also shows two OADM modules 72 and 74, for example as described above, which are coupled to the optical switch 92.

More particularly, in the arrangement of FIG. 8 an incoming optical signal on the optical fiber 10 is supplied to one input (input 1 as illustrated) of the optical switch 92, and an outgoing optical signal is supplied from one output (output 1 as illustrated) of the optical switch 92 to the ongoing part 11 of the optical fiber 10. Although FIG. 8 relates to transmission of optical signals in only one direction on the optical fiber 10, it will be appreciated that the arrangement can accommodate bidirectional transmission in a similar manner to that described above.

Each OADM module 72, 74 has an input coupled to another respective output of the optical switch 92 and an output coupled to another respective input of the optical switch 92, and provides for dropping and/or adding an optical band or channel as described above. Conveniently for providing a modular arrangement, as illustrated, each OADM module is coupled to a respective correspondingly-numbered output and input of the optical switch 92. For example, in FIG. 8 the optical switch input number 2 and output number 2 are coupled to the output and input, respectively, of the same OADM module 72.

The optical switch 92 is controlled to provide desired couplings between its optical inputs and outputs. For example, a connection from its input 1 to its output 1 provides a direct coupling of the fiber 10 to its ongoing part 11; thus OADM modules such as 72 and 74, and/or other optical components, can be changed, added, and removed with minimal interruption of optical traffic on the fiber 10. Such modules are incorporated into the optical path by changing optical connections via the optical switch 92. For example, as shown by dashed lines in FIG. 8, the OADM modules 72 and 74 can be incorporated into the optical path by controlling the optical switch 92 instead to couple its input 1 to output 3, input 3 to output 2, and input 2 to output 1.

It can be appreciated that such control of the optical switch 92 can be carried out by software in a similar manner, and with the same convenience and advantages, as in the other connection arrangements in accordance with the invention as described above. It will also be appreciated that the size, i.e. number N of inputs and outputs, of the optical switch 92 can be selected to meet particular needs and that, as in the connection arrangements in accordance with embodiments of the invention as described above, the connection arrangement of FIG. 8 can be expanded by coupling one or more other optical switches to inputs and outputs of the optical switch 92.

Furthermore, it can be appreciated that, in a similar manner to the series arrangements of 2×2 optical switches as described above, a plurality of N×N optical switches can also be coupled in series with one another in the optical path. More generally, the connection arrangement can comprise any of a wide variety of combinations of optical switches, in series and/or parallel configurations, regardless of the particular size of each optical switch. One advantageous arrangement is illustrated in FIG. 9, in which two similar N×N optical switches 92 and 94, with their inputs and outputs coupled in similar patterns to facilitate control, are provided in series between the optical fiber 10 and its ongoing part 11.

Figure 9:
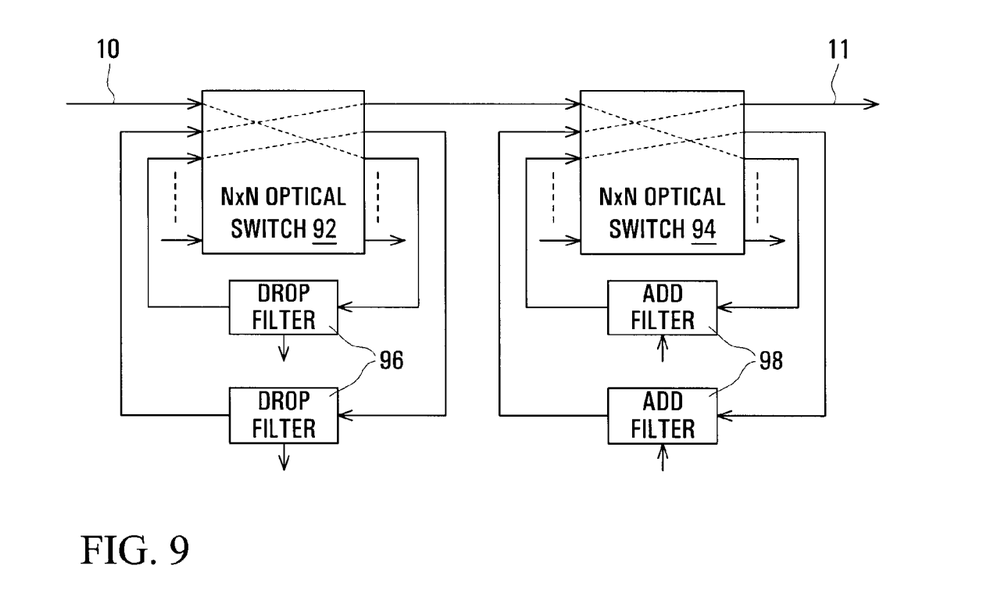
FIG. 9 illustrates a modification of the optical connection arrangement of FIG. 8.

The connection arrangement of FIG. 9 operates in a similar manner to that of FIG. 8, except that the OADMs 72, 74 of FIG. 8 are replaced in the connection arrangement of FIG. 9 by separate optical drop filters 96 coupled between corresponding outputs and inputs of the optical switch 92, and optical add filters 98 coupled between corresponding outputs and inputs of the optical switch 94. This arrangement facilitates dropping optical bands or channels closest to the incoming optical fiber 10, and adding optical bands or channels closest to the ongoing part 11 of the fiber 10, thereby minimizing attenuation of the optical signals. It can be appreciated that such attenuation can be compensated by optical amplifiers coupled between respective outputs and inputs of the optical switches instead of OADM modules, drop or add filters, or other optical components.

It can be appreciated that the optical switches in the embodiments of the invention described above provide signal attenuation, which can be compensated by optical amplifiers. Conveniently, such optical amplifiers can be combined directly with one, some, or all of the optical switches or switch stages. For example, in the arrangement of FIG. 2 the 2×2 switch 40 can include two optical amplifiers (not shown), one for each optical path preferably at the output side of the switch. In the arrangement of FIG. 3 a single optical amplifier (not shown) can be provided in the optical path between the 1×2 optical switches 46 and 48, to compensate for signal attenuation in these switches. In the arrangements of FIGS. 8 and 9, N optical amplifiers (not shown) can conveniently be provided for each N×N optical switch, one optical amplifier in each of the N output paths of the switch.

Similar comments apply in respect of the other optical switches, thus each optical switch or switching stage can include an optical amplifier for each of its optical paths to compensate for signal attenuation in that switch or switching stage, so that optical signal attenuations are compensated by optical signal gains distributed throughout the connection arrangement. Alternatively, optical amplifiers need not be provided in the connection arrangement, or can be provided only at particular points in the connection arrangement to provide lumped optical signal gain as may be desired.

Although particular embodiments of the invention and variations have been described above in detail above, it can be appreciated that numerous other modifications, variations, and adaptations may be made without departing from the scope of the invention as defined in the claims.

What is claimed is:

1. An optical connection arrangement comprising:
   a plurality of optical ports, each optical port comprising at least two optical connections for respectively supplying an optical signal to and receiving an optical signal from an optical component coupled to the respective optical port;
   an optical signal input;
   an optical signal output; and
   tow or more optical switches coupled to the optical signal input, the optical signal output, and the plurality of optical ports, the optical switch being controllable to provide one or more of the following:
      a direct optical path from the optical signal input to the optical signal output, which bypasses the optical component; and
      another optical path from the optical signal input to the optical signal output selectively via least one of the plurality of optical connections, including said optical component.

2. An optical connection arrangement as claimed in claim 1, wherein the optical component is one or more of the following:
   an add/drop multiplexer;
   a drop filter;
   an add filter;
   an optical amplifier;
   an optical signal monitor; and
   a dispersion compensation module.

3. An optical connection arrangement comprising two optical connection arrangements each as claimed in claim 1, the optical signal output of one optical connection arrangement being coupled to the optical signal input of the other optical connection arrangement.

4. An optical connection arrangement as claimed in claim 1, wherein the optical switch comprises an N×N optical switch having N optical input ports and N optical output ports, where N is an integer greater than 2, which is controllable to selectively connect each of its input ports to any of its output ports; and wherein each of the optical connection arrangement optical ports has two optical connections coupled to a respective output port, and to a respective input port the optical switch for respectively supplying an optical signal to and receiving an optical signal from an optical component coupled to the respective optical port.

5. An optical connection arrangement as claimed in claim 4, wherein the optical component is one or more of the following:
   an add/drop multiplexer;
   a drop filter;
   an add filter;
   an optical amplifier;
   an optical signal monitor; and
   a dispersion compensation module.

6. An optical connection arrangement comprising two optical connection arrangements each as claimed in claim 4, the optical signal output of one optical connection arrangement being coupled to the optical signal input of the other optical connection arrangement.

7. An optical connection arrangement comprising a plurality of optical ports, each optical port comprising at least two optical connections for respectively supplying an optical signal to mid receiving an optical signal from an optical component coupled to the respective optical port; an optical signal input; an optical signal output; and two or more optical switches coupled to the optical signal input, the optical signal output, and the plurality of optical ports, the optical switch being controllable to provide a direct optical path from the optical signal input to the optical signal output, which bypasses the optical component; and another optical path from the optical signal input to the optical signal output selectively via at least one of the plurality of optical connections, including said optical component, wherein each optical port has an optical connection to one of two optical outputs of a preceding optical switch stage, and an optical connection to one of two inputs of a following switch stage, the optical switch stages constituting said two or more optical switches first one of said optical switch stages having an optical input coupled to said optical signal input and a last one of said optical switch stages having an optical output coupled to said optical signal output, the arrangement further comprising an optical coupling from another of the two optical outputs of each said preceding optical switch stage to another of the two inputs of the respective following switch stage for optically bypassing the respective optical port, each optical switch stage having two optical connection states between its input(s) and its output(s), the optical switch stages being controllable to include selectively each optical port in, or selectively exclude it from, an optical path from said optical signal input to said optical signal output.

8. An optical connection arrangement as claimed in claim 7 wherein at least one of the optical switch stages comprises a 2×2 optical switches.

9. An optical connection arrangement as claimed in claim 7 wherein at least one of the optical switch stages comprises two 1×2 optical switches coupled in series to provide two optical inputs and two optical outputs.

10. An optical connection arrangement as claimed in claim 7 wherein there are at least three optical ports and at least four optical switch stages.

11. An optical connection arrangement as claimed in claim 7 and including at least one optical add/drop multiplexer coupled to a respective one of the optical ports.

12. An arrangement comprising two optical connection arrangements each as claimed in claim 7, the optical signal output of one optical connection arrangement being coupled to the optical signal input of the other optical connection arrangement.

13. An arrangement as claimed in claim 12 and including a further optical port having two optical connections, for respectively supplying an optical signal to and receiving an optical signal from an optical component coupled to the further optical port, coupled respectively to a second output of said last one of the optical switch stages of said one optical connection arrangement and to a second input of said first one of the optical switch stages of said other optical connection arrangement.

14. An arrangement comprising two optical connection arrangements each as claimed in claim 7, for two opposite directions of transmission of optical signals, the plurality of optical ports being common to the two optical connection arrangements and each optical port comprising four optical connections for respectively supplying an optical signal to and receiving an optical signal from an optical component for each direction of transmission coupled to the respective port.

15. An arrangement as claimed in claim 14 and including at least one pair of optical add/drop multiplexers coupled to a respective one of the optical ports.

16. An optical arrangement comprising two arrangements each as claimed in claim 15 and coupled in series with one another for the two opposite directions of transmission of optical signals.

17. An arrangement as claimed in claim 16 and including a further optical port between the series-coupled optical connection arrangements, the further optical port having four optical connections coupled respectively to second outputs of said last one of the optical switch stages for the two opposite directions of transmission, and second inputs of said first one of the optical switch stages for the two opposite directions of transmission, of the respective optical connection arrangements.

18. An optical connection arrangement in an optical path, comprising: two or more optical switches and a plurality of optical ports, each optical port comprising at least two optical connections, which can be selectively included in the optical path or bypassed by control of said two or more optical switches, the optical ports each being arranged for a coupling to a plurality of optical add/drop multiplexers (OADMs) via respective optical connections so that at least one OADM is optically coupled to a respective port of the optical connection arrangement by the plurality of optical connections, thereby the optical path selectively including none, one or more of the OADMs.

19. A method for modifying optical connection arrangement couplings of one or more optical components to the optical path in the optical connection arrangement of claim 1, comprising the steps of:
   controlling the optical path in the optical connection arrangement by selectively
   including or bypassing each optical port in the optical path;
   changing the optical connection couplings of at least one optical component to a respective optical port, the optical connection couplings being controlled to selectively bypass the respective optical port; and
   subsequently controlling the optical connection arrangement to selectively include the respective optical port and said optical component in the optical path.

* * * * *

UNITED STATES PATENT AND TRADEMARK OFFICE
CERTIFICATE OF CORRECTION

PATENT NO. : 6,674,935 B2
APPLICATION NO. : 09/880811
DATED : January 6, 2004
INVENTOR(S) : C.G. Kelly et al.

It is certified that error appears in the above-identified patent and that said Letters Patent is hereby corrected as shown below:

Column 10, line 45, "tow" is corrected to read as --two--.

Column 10, line 53, "via least one" is corrected to read as --via at least one--.

Column 11, line 10, "port, and" is corrected to read as --port and--.

Column 11, line 11, "port the" is corrected to read as --port of the--.

Column 11, line 32, "to mid receiving" is corrected to read as --to and receiving--.

Column 11, line 47, "switches first one" is corrected to read as --switches, a first one--.

Column 12, line 31, "claim 15" is corrected to read as --claim 14--.

Signed and Sealed this

Twelfth Day of August, 2008

JON W. DUDAS
*Director of the United States Patent and Trademark Office*